INVENTOR.
John C. Dionne

July 1, 1952 J. C. DIONNE 2,602,108
FLAW DETECTION PICKUP
Filed Nov. 13, 1948 3 Sheets-Sheet 2
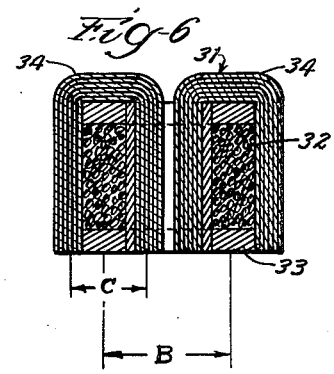
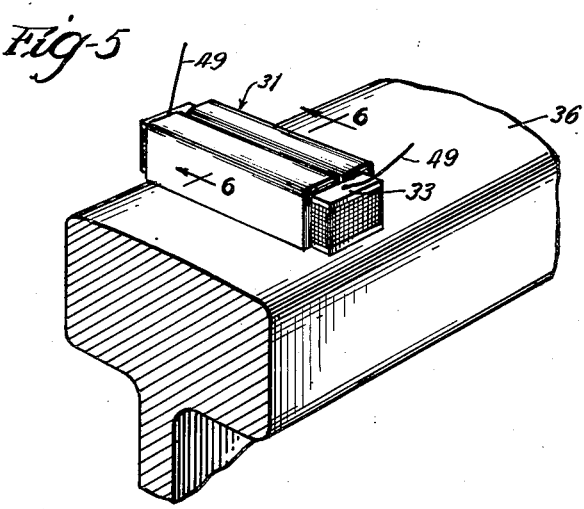
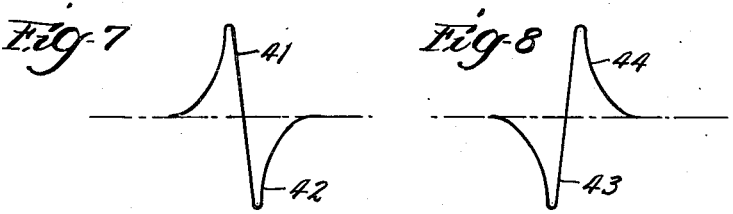
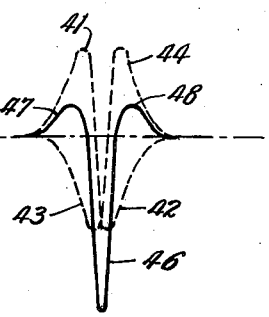
INVENTOR.
John C. Dionne.
By:- Mann and Brown
Attys.

July 1, 1952  J. C. DIONNE  2,602,108
FLAW DETECTION PICKUP
Filed Nov. 13, 1948  3 Sheets—Sheet 3
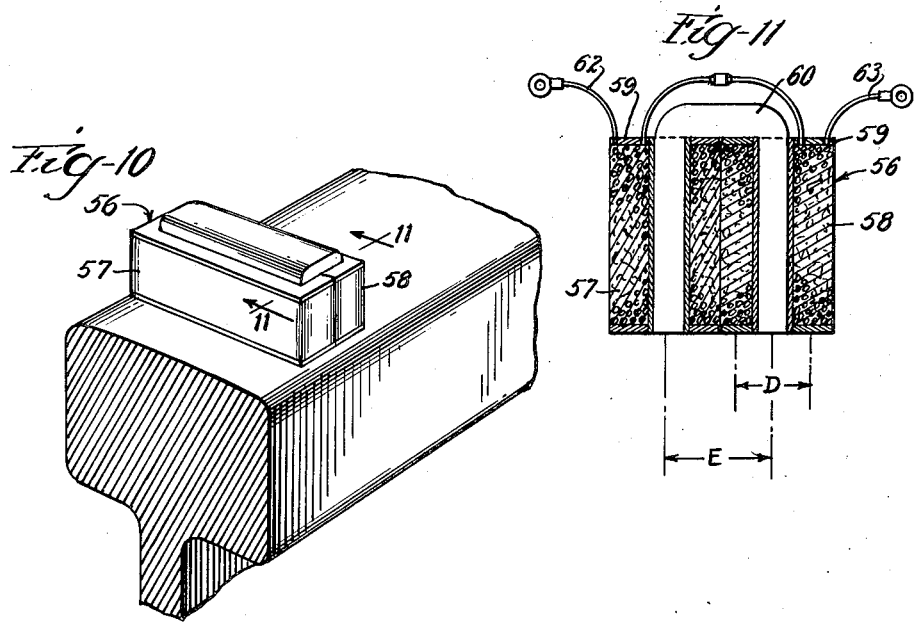
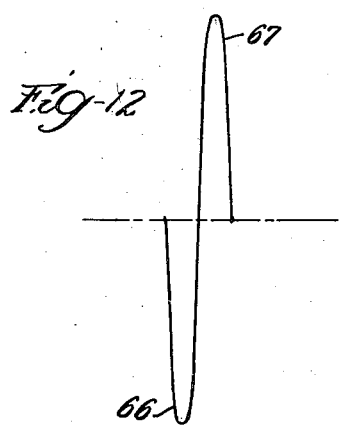
INVENTOR.
John C. Dionne
By: Mann and Brown
Attys.

Patented July 1, 1952

2,602,108

UNITED STATES PATENT OFFICE 2,602,108

FLAW DETECTION PICKUP

John C. Dionne, Chicago, Ill.

Application November 13, 1948, Serial No. 59,955

13 Claims. (Cl. 175—183)

This invention relates to the detection of latent flaws in rail by passing an inductive pickup over the rail after it has been energized to produce characteristic magnetic conditions in the vicinity of such flaws. Obviously, any attempt to distinguish between true fissures and inconsequential non-fissure defects in the rail by the differences in their magnetic fields, must start with the pickup itself, since the amplifying and recording apparatus can be no more accurate than the pickup used to produce the voltage waves induced from the movement through the magnetic field.

During the process of energizing the rail, not only are magnetic fields set up about the flaws, but fields are also set up about other non-important defects. The latter defects are not inherently dangerous to the operation of trains over the rail, and consequently there is no necessity of making a record of their presence. If the pickup can make some form of discrimination between the type of voltage wave produced when a flaw is traversed and that produced when a non-important defect is traversed, there is at least a possibility that electrical apparatus can be devised to separate the flaw voltage wave from the others. If the pickup does not so discriminate, the separation of fissure waves is impossible.

The principal object of the present invention is to produce a voltage wave from the magnetic field about a flaw, which is electrically identifiable from the wave induced as a non-important defect is traversed. A number of characteristics of the wave may be used in making the identification; and when the voltage wave from the pickup is found to have these characteristics, it will be reasonably accurate to assume that a fissure, rather than a non-important defect, is present. The characteristics include: (a) at least a certain minimum strength; (b) a predetermined polarity (initial polarity if it is a duopolarity type of pickup); and (c) a frequency substantially corresponding to a predetermined standard.

The tests used to establish these characteristics will probably not eliminate joint indications, for a joint, in reality, is a large fissure, and the magnetic fields about a joint are similar to a fissure except that they are much stronger and are somewhat more elongated because of rail-end separation. In most instances it is desirable to record joints, as it affords a method for determining the location of the fissure from the record made on the tape.

Since the joint field is so much stronger than that about a fissure, the wires traversing a field tend to generate a proportionately stronger voltage as it is traversed. A second object of the invention, therefore, is to provide a pickup which will decrease the difference in strength between that of a fissure signal and that of a strong joint signal, to thereby lessen the possibility of saturating the amplifier with a joint signal and preventing the identification of a signal from a nearby fissure.

Additional objects and advantages of the invention will become apparent from the following description taken in conjunction with the drawings, in which Fig. 1 is a perspective view of the type of pickup used in identifying the characteristics of the magnetic field about a magnetized fissure;

Fig. 5 is a perspective view of a single coil pickup embodying the present invention positioned over a rail head;

Fig. 6 is a section taken at line 6—6 of Fig. 5;

Figs. 7, 8 and 9 are voltage wave diagrams used to explain the operation of the pickup of Fig. 5;

Fig. 10 is a perspective view of a double coil pickup embodying the present invention positioned over the head of the rail;

Fig. 11 is a section taken at line 11—11 of Fig. 10; and

Fig. 12 is a diagram of the type of voltage wave produced by the pickup of Figs. 10 and 11.

One of the difficulties in seeking to locate fissures in rail by energizing the rail and then searching for the magnetic field about the fissure is that in dealing with magnetic fields one is confronted by the intangibleness of the subject matter. None of the human senses will give one an idea of the size, shape, etc. of the magnetic field. It cannot be seen nor felt. It is only the effects of the magnetic field that make its presence known and are capable of ascertainment. For this reason, there has been much fumbling about in an effort to determine the best type of flaw detection pickup to be used to identify the magnetic fields characteristic of fissures and to differentiate those fields in terms of electric voltage characteristics from the fields surrounding energized non-fissure defects.

Figure 1:
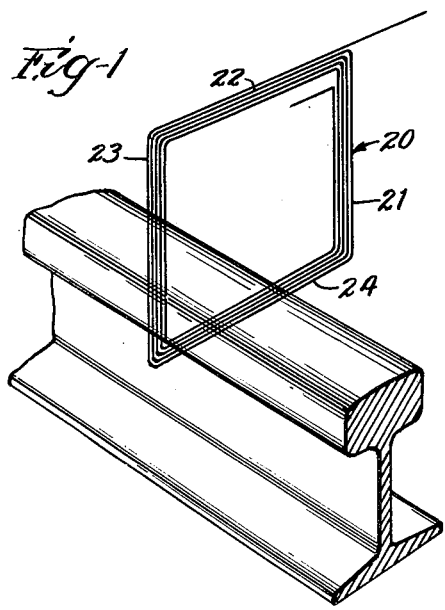

Through the use of a pickup 20, such as shown in Fig. 1, I have discovered a very significant characteristic of the magnetic field about a magnetized fissure, and this discovery has enabled me to create pickup coils which are capable of differentiating between fissures and non-fissure defects with an unusually high degree of accuracy.

A coil passed through a magnetic field will not give a true picture of the characteristics of the field because by the very fact that the coil has dimensions, the different portions of the windings will be in different parts of the magnetic field at the same instant and, therefore, will be diversely affected. Since only the total of the individual responses at various portions of the coil will appear in the output signal of the pickup, it is extremely difficult to ascertain what the effect of the magnetic field (and, thus, the characteristics of the field at a particular point or series of points) is on a single portion of the coil. By using a single wire cutting through the field the dimensional effect is reduced to a minimum, and the best obtainable picture of the field in terms of output voltage will be obtained.

However, unless the magnetic field is considerably stronger than that about a fissure in a rail, the voltage generated in the wire is so small that it is impractical for use in determining the shape of the produced voltage wave. As the best possible compromise, I have used experimentally a coil, generally 20, in which the sides 21, 22 and 23 were so far removed from testing side 24 that they were substantially unaffected by the magnetic field. Thus, the voltage output of coil 20 was substantially only the voltage generated by side 24 in passing through the magnetic field. As a further step in eliminating the dimensional effect of the coil, the size of side 24, as measured longitudinally of the rail (parallel to the line of movement) was kept as nearly as possible to the thickness of one strand of wire.

The testing procedure included connecting the coil to the amplifier which, in turn, was connected to an oscilloscope. A moving picture camera was used to make a continuous record of the pattern on the oscilloscope. Upon moving the coil through the magnetic fields about a number of different types and sizes of fissures, I found that the voltage generated would invariably be of the configuration illustrated in Fig. 2. By carefully checking the speed of travel of the pickup and the speed of travel of the film through the camera it was found that the dimension "A" of Fig. 2 was $\frac{1}{16}$ of an inch. The characteristic is of extreme importance, for no matter what the size or the type of the fissure might be, the dimension "A" remained substantially $\frac{1}{16}$ on an inch. This indicates that as the wire traverses the field, a maximum number of magnetic lines of force will be initially cut by the wire when the wire comes within $\frac{3}{32}$ of an inch of being vertically over the fissure, and a similar situation is again encountered when the wire has passed $\frac{3}{32}$ of an inch beyond a position directly over the fissure. Furthermore, with a given type of magnetization, the initial pulse 26 of the voltage wave will always be of a given polarity and, of course, will be followed by a pulse 27 of the opposite polarity.

Figure 2:
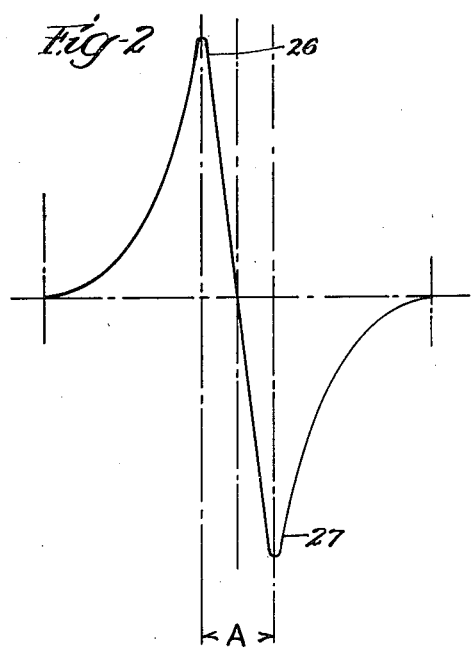
Fig. 2 is an illustration of the type of voltage wave produced as the pickup of Fig. 1 traverses the magnetic field about a fissure.
Figure 3:
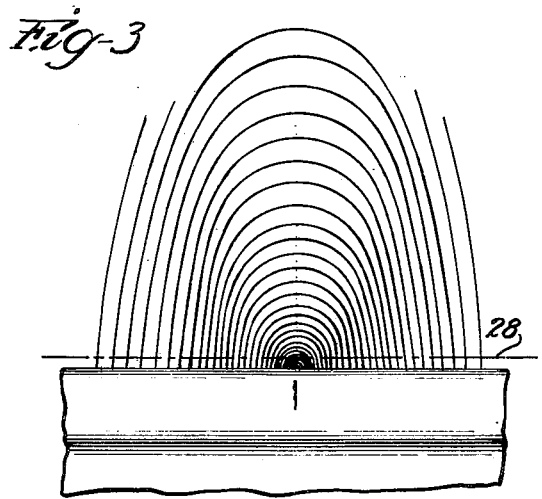
Fig. 3 is an elevation of the head of a rail, illustrating diagrammatically the type of magnetic field that is believed to exist about a magnetized fissure.

From the voltage curve of Fig. 2 it is postulated that the magnetic field about a fissure must have somewhat the appearance of that illustrated in Fig. 3. The spacing of the lines of Fig. 3 is intended to illustrate the concentration of the magnetic lines of force. It will be observed that, if the wire travels through the field of Fig. 3 from one side to the other along a line such as is indicated at 28, the pickup will gradually cut an increasing number of lines of force until it reaches a point slightly ahead of a position directly above the fissure. As has previously been explained, the distance between those two points is $\frac{3}{32}$ of an inch. From there onto a point $\frac{3}{32}$ of an inch beyond the fissure, the wire will be threading the majority of the lines of force, and, as a result, the voltage wave drops off very sharply and equally rapidly increases to a maximum in the opposite direction when the wire has moved to a point $\frac{3}{32}$ on an inch beyond the fissure.

Figure 4:
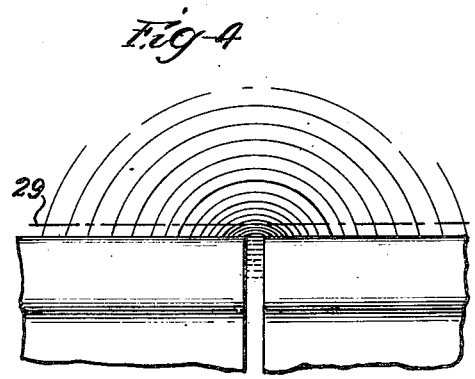
Fig. 4 is an elevation of the heads of two rails at a joint and illustrating diagrammatically the type of magnetic field that is believed to exist at a magnetized joint.

When the wire traverses a magnetic field that is more elongated than that about a fissure, the distance "A" of Fig. 2 will increase because the wire will be threading the loops at the center of the field for a greater distance at the center of the field. Fig. 4 illustrates a pair of magnetized rail ends having a slight separation between them. There is no attempt to correlate the illustrated strengths of the fields of Figs. 3 and 4. Obviously, the strength of the rail end field is much greater than that about a fissure. It will be seen that if pickup 20 travels over the joint along a line 29, it will be traveling parallel to (or threading) the lines of force at the center of the joint and will cut a maximum number of lines of force some distance to either side of the center and will produce a voltage wave having a peaked dimension "A" of greater length than $\frac{1}{16}$ of an inch. Other types of elongated fields, such as those surrounding burns, corrugations, etc., will create diverse patterns of voltage waves.

Figs. 5 and 6 illustrate a form of a single coil pickup, generally 31, which I have devised to take advantage of the foregoing characteristics of the magnetic field about fissures. Pickup 31 consists of a coil 32 wound on a non-magnetic bobbin 33, a pair of U-shaped cores 34, each having one leg projecting within the central opening of bobbin 33 and the other leg projecting downwardly at a side of coil 32.

Pickup 31 is so proportioned that the mean width between the sides of the coil windings, as measured parallel to the line of movement of the coil over rail head 36, which distance is illustrated by the measurement "B" in Fig. 6, is substantially $\frac{1}{16}$ of an inch. While the $\frac{1}{16}$ of an inch length is the theoretical optimum, some slight variation above and below this figure is possible without greatly impairing the operation of the pickup. To obtain the best results the length of "B" should not be less than $\frac{3}{8}$ of an inch, nor larger than $\frac{3}{4}$ of an inch.

Figs. 7, 8 and 9 have been drawn to illustrate what is believed to be the action of pickup 31. Assume that pickup 31 consists of a single loop of wire, instead of a plurality of loops, the two sides of which loop are spaced a distance "B" apart. As the first of said two sides traverses the magnetic field above a fissure, a voltage wave, as illustrated in Fig. 7, and consisting of an initial pulse 41 and a second pulse 42 of opposite polarity, is produced. As the other side of the single loop traverses the magnetic field, there is produced the voltage wave of Fig. 8, which consists of an initial pulse 43 followed by a second pulse 44. The like ends of the first and second sides of the loop will have induced potentials of like signs, but since the two sides are connected to the external circuit in the reverse of each other, the initial pulses 41 and 43 will appear to the external circuit as being of opposite polarity.

Fig. 9 illustrates how the voltage waves of Figs. 7 and 8 are combined to produce a composite pulse which is transmitted from the loop to the external circuit. Pulses 42 and 43 of the same polarity combine to produce a large single pulse 46, which is preceded and followed by two considerably smaller pulses 47 and 48, respectively, of the opposite polarity. Due to the dimensional effect of a winding 32 of pickup 31, small loops 47 and 48 are actually not apparent in the output of pickup 31, and an amplifier and an oscilloscope connected to the output leads of 31 reveals only a single, large pulse 46 as the pickup traverses a magnetized fissure. With a given magnetization pulse 46 will be of a predeterminable polarity.

Since the peaking effect of pulse 46 was obtained from the composition of pulses 42 and 43 based on a spacing of substantially $\frac{7}{16}$ of an inch, the same peaking will not be obtained when the pickup traverses magnetic fields wherein the concentration of the maximum number of magnetic lines of force is found to be spaced at distances substantially greater than $\frac{7}{16}$ of an inch. For this reason, coil 32 of pickup 31 is remarkably effective in differentiating in terms of output voltage between the magnetic fields characteristic of fissures and those of non-fissure defects.

It will be noted that the spacing "B" has been assumed to be slightly less than $\frac{7}{16}$ of an inch as indicated by the fact that the peaks of impulses 42 and 43 in Fig. 9 are not coincident. Empirically it has been found that if the mean width "B" is approximately $\frac{7}{16}$ of an inch, the discriminatory performance of the coil and amplifier is slightly better than it is at the theoretically optimum of $\frac{7}{16}$ of an inch even though at the latter figure the peak voltage of the wave is at a maximum. By the same process it has been found desirable to have the mean width of the core 34 (as illustrated by the distance "C" of Fig. 6) a distance of $\frac{9}{32}$ of an inch. It will be noted that the latter distance is equal to the horizontal distance from the fissure to the point of maximum concentration of lines of force of the magnetic field.

By way of specific example, a pickup to be used in covering all of rail head 36 may be made by winding 10,000 turns of No. 42 enameled wire on a bobbin which is 2¼ inches long, $\frac{7}{16}$ inch high, and having an internal opening of 1¼ inches. Cores 34 consist of six laminations of 0.014 inch high permeable iron.

Figs. 10 and 11 illustrate an embodiment of the invention wherein the output voltage wave is of double polarity rather than the single polarity wave produced by pickup 31. In this form the pickup, generally 56, comprises a pair of coils 57 and 58 wound on non-magnetic bobbins 59. An inverted U-shaped core 60 of high permeable material interconnects the two coils 57 and 58 with either leg of the core projecting within the central opening of the two bobbins 59 respectively. The windings of the two coils 57 and 58 are connected in series opposition. To determine whether or not the proper connection has been made a battery may be attached to the two external leads 62 and 63, and if the connection is proper, the two legs of core 60 should be of opposite polarity.

Fig. 12 illustrates the general configuration of the voltage wave produced by pickup 56. The wave consists of two impulses 66 and 67 of opposite polarity, and each having somewhat the same general configuration as impulse 46 from pickup 31. With a given magnetization of the rail, the polarity of the initial pulse 66 will always be the same.

While the data obtained as to the concentration of the lines of force of the magnetic field about a fissure has been extremely helpful in determining, generally, the range of size for a pickup if it is to be most effective in responding to the fissure field, yet it has been found empirically that a double coil pickup of the type illustrated in Fig. 10 is not the most effective when the coil windings are formed at that theoretically optimum size. I have found that in a pickup in which the coils are somewhat smaller than that optimum size, better results can be obtained. If the mean width of the coils as measured parallel to the line of movement of the double coil pickup along the rail, which width is indicated at "D" in Fig. 11, is $\frac{9}{32}$ of an inch with the mean width of the two sides of pole piece 60 being approximately $\frac{7}{16}$ of an inch, the performance of the pickup is highly effective for use with an amplifier in discriminating between the magnetic fields about fissures and those about non-fissure defects. The reason for the seeming reversal in sizes between those of the windings and those of the core between the sizes for a single coil pickup and those of the double coil pickup is probably to be found in the inter-action that is obtained between the two coils of the pickup 56 due to their proximity and linkage by core 60.

It is well known that a change in the amount of flux threading the core of a coil will induce a voltage in that coil. It may be that in the double coil pickup the threading theory will more nearly account for the action of the pickup. The spacing of the pole pieces in pickup 56 is substantially $\frac{7}{16}$ of an inch, and this might appear to be significant in view of the spacing of the maximum concentration in lines of force above the fissures in rails.

The term "fissures" is intended to include not only those cleavages which originate internally of the rail, but also those sometimes termed "detailed fractures" which may originate on the surface of the rail. These are differentiated from "non-fissure" defects such as burns, gags, corrugations, etc.

The choice of particular embodiments of the invention for specific illustration and description is merely a compliance with Section 4888 of the revised statutes, and should not be construed as imposing unnecessary limitations on the appended claims.

I claim:

1. A pickup of the type adapted to be moved along a line longitudinally of the surface of a rail for the detection of flaws therein, said pickup including a coil formed about an axis normal to the surface of the rail with an opening in the center of the coil, said coil being wound with the mean width between the sides of the coil windings as measured parallel to the line of movement being not greater than ¾ of an inch and not less than ⅜ of an inch, and a core within said opening forming a high permeability path through the coil.

2. A pickup of the type adapted to be moved along a line longitudinally of the surface of a rail for the detection of flaws therein, said pickup including a coil formed about an axis normal to the surface of the rail with an opening in the center of the coil, said coil being wound with the mean width between the sides of the coil windings as measured parallel to the line of movement being substantially $\frac{9}{16}$ of an inch, and a core within said opening forming a high permeability path through the coil.

3. A pickup of the type adapted to be moved along a line longitudinally of the surface of a rail for the detection of flaws therein, said pickup including a coil formed about an axis normal to the surface of the rail with an opening in the center of the coil, said coil being wound with the mean width between the sides of the coil windings as measured parallel to the line of movement being not greater than $\frac{3}{4}$ of an inch and not less than $\frac{3}{8}$ of an inch, and an inverted U-shaped core having a high permeability, one leg of said core being received within said opening.

4. A pickup of the type adapted to be moved along a line longitudinally of the surface of a rail for the detection of flaws therein, said pickup including a coil formed about an axis normal to the surface of the rail with an opening in the center of the coil, said coil being wound with the mean width between the sides of the coil windings as measured parallel to the line of movement being substantially $\frac{9}{16}$ of an inch, and an inverted U-shaped core having a high permeability, one leg of said core being received within said opening.

5. A pickup of the type adapted to be moved along a line longitudinally of the surface of a rail for the detection of flaws therein, said pickup including a pair of coils positioned adjacent to each other along the line of movement and connected in series opposition, each of said coils being formed about an axis normal to the surface of the rail with an opening in the center of the coil, each of said coils being wound with the mean width between the sides of the coil windings as measured parallel to said line of movement being not greater than $\frac{3}{4}$ of an inch and not less than $\frac{3}{8}$ of an inch, and an inverted U-shaped core, the two legs of said core being received within the openings of the two coils respectively thereby forming a high permeability path through each coil.

6. A pickup of the type adapted to be moved along a line longitudinally of the surface of a rail for the detection of flaws therein, said pickup including a pair of coils positioned adjacent to each other along the line of movement and connected in series opposition, each of said coils being formed about an axis normal to the surface of the rail with an opening in the center of the coil, said coils being positioned with the distance between the axes of the two coils as measured parallel to said line of movement being not less than $\frac{3}{8}$ of an inch and not greater than $\frac{3}{4}$ of an inch, and an inverted U-shaped core, the two legs of said core being received within the openings of the two coils respectively thereby forming a high permeability path through each coil.

7. A pickup of the type adapted to be moved along a line longitudinally of the surface of a rail for the detection of flaws therein, said pickup including a coil formed about an axis normal to the surface of the rail with an opening in the center of the coil, said coil being wound with the mean width between the sides of the coil windings as measured parallel to the line of movement being not greater than $\frac{3}{4}$ of an inch and not less than $\frac{3}{8}$ of an inch, and a pair of inverted U-shaped cores, one leg of each of said cores being received within said opening and with the other leg of each of said cores being adjacent to either side of said coil.

8. A pickup of the type adapted to be moved along a line longitudinally of the surface of a rail for the detection of flaws therein, said pickup including a coil formed about an axis normal to the surface of the rail with an opening in the center of the coil, said coil being wound with the mean width between the sides of the coil windings as measured parallel to the line of movement being not substantially greater than $\frac{3}{4}$ of an inch and not less than $\frac{3}{8}$ of an inch, and a pair of inverted U-shaped cores, one leg of each of said cores being received within said opening and with the other leg of each of said cores being adjacent to either side of said coil, the two legs of said cores within said opening being spaced from each other.

9. A pickup of the type adapted to be moved along a line longitudinally of the surface of a rail for the detection of flaws therein, said pickup including a coil formed about an axis normal to the surface of the rail with an opening in the center of the coil, said coil being wound with the mean width between the sides of the coil windings as measured parallel to the line of movement being substantially $\frac{9}{16}$ of an inch, and a pair of inverted U-shaped cores, one leg of each of said cores being received within said openings and with the other leg of each of said cores being adjacent to either side of said coil.

10. A pickup of the type adapted to be moved along a line longitudinally of the surface of a rail for the detection of flaws therein, said pickup including a coil formed about an axis normal to the surface of the rail with an opening in the center of the coil, said coil being wound with the mean width between the sides of the coil windings as measured parallel to the line of movement being substantially $\frac{9}{16}$ of an inch, and a pair of inverted U-shaped cores, one leg of each of said cores being received within said opening and with the other leg of each of said cores being adjacent to either side of said coil, the two legs of said cores within said opening being spaced from each other.

11. A pickup of the type adapted to be moved along a line longitudinally of the surface of a rail for the detection of flaws therein, said pickup including a coil formed about an axis normal to the surface of the rail with an opening in the center of the coil, and an inverted U-shaped core having a high permeability, one leg of said core being received within said opening, the total length of said pickup as measured parallel to said line of movement being less than one inch.

12. A pickup of the type adapted to be moved along a line longitudinally of the surface of a rail for the detection of flaws therein, said pickup including a coil formed about an axis normal to the surface of the rail with an opening in the center of the coil, and an inverted U-shaped core having a high permeability, one leg of said core being received within said opening, said pickup being so constructed and arranged that a maximum voltage output is produced when the pick-up traverses magnetic fields characterized by having the points of maximum concentration of flux spaced substantially $\frac{9}{16}$ of an inch apart longitudinally of the rail.

13. A pickup of the type adapted to be moved along a line longitudinally of the surface of a rail for the detection of flaws therein, said pickup including a coil member formed about an axis normal to the surface of the rail with an opening in the center of the coil having two sides thereof substantially normal to said line of movement, and a U-shaped core member, the two opposite sides of which project downwardly toward the upper face of said rail with one of said sides being positioned within said coil member opening, the mean width between the sides of one of said members as measured parallel to said line of movement being substantially $\frac{3}{32}$ of an inch, and the mean width between the sides of the other of said members as measured parallel to said line of movement being substantially $\frac{1}{16}$ of an inch.

JOHN C. DIONNE.

REFERENCES CITED

The following references are of record in the file of this patent:

UNITED STATES PATENTS

| Number | Name | Date |
|---|---|---|
| 2,307,446 | Bettison | Jan. 5, 1943 |
| 2,317,719 | Barnes et al. | Apr. 27, 1943 |
| 2,356,968 | Barnes et al. | Aug. 29, 1944 |
| 2,388,683 | Frickey et al. | Nov. 13, 1945 |